United States Patent [19]
Goldman

[11] Patent Number: 5,963,982
[45] Date of Patent: Oct. 5, 1999

[54] DEFRAGMENTATION OF STORED DATA WITHOUT POINTER INDIRECTION

[75] Inventor: Phillip Y. Goldman, Los Altos, Calif.

[73] Assignee: WebTV Networks, Inc., Mountain View, Calif.

[21] Appl. No.: 08/887,353

[22] Filed: Jul. 2, 1997

[51] Int. Cl.[6] .................................................. G06F 11/20
[52] U.S. Cl. .............................. 711/170; 707/206; 710/56
[58] Field of Search .......................... 711/170; 707/206, 707/205; 395/876; 710/56

[56] References Cited

U.S. PATENT DOCUMENTS

| | | | |
|---|---|---|---|
| 4,912,629 | 3/1990 | Shuler, Jr. ................................ | 707/206 |
| 5,325,423 | 6/1994 | Lewis ........................................ | 379/93 |
| 5,398,142 | 3/1995 | Davy ........................................ | 360/48 |
| 5,463,776 | 10/1995 | Voigt et al. ............................. | 707/101 |
| 5,488,411 | 1/1996 | Lewis ........................................ | 348/8 |
| 5,538,255 | 7/1996 | Barker ...................................... | 463/41 |
| 5,564,001 | 10/1996 | Lewis ........................................ | 345/302 |
| 5,574,907 | 11/1996 | Jernigan, IV et al. ...................... | 707/1 |
| 5,612,730 | 3/1997 | Lewis ........................................ | 348/8 |
| 5,638,506 | 6/1997 | Peterson et al. ........................... | 714/7 |
| 5,802,599 | 9/1998 | Cabrera et al. ........................... | 711/170 |

OTHER PUBLICATIONS

Norton, Peter, The Norton Utilities, Version 5.0, pp. 135–152, 1990.

Executive Software, "Fragmentation Eliminated by Diskeeper for Windows NT.", News Release, Dec. 6, 1994.

*Primary Examiner*—Eddie P. Chan
*Assistant Examiner*—Hong Kim
*Attorney, Agent, or Firm*—Workman, Nydegger, Seeley

[57] ABSTRACT

A technique for defragmenting data stored in memory in a computer system includes the step of creating a table in memory including the locations of all pointers associated with stored data. The pointers are stored in a separate block of memory from the table. Data is defragmented only at idle time. In response to the defragmentation, only the values of the pointers are updated, while the locations of the pointers and the corresponding table entries remain fixed. Pointers can be updated using pointer update methods that are specific to particular classes of objects or using a generic method for all classes in conjunction with a list of pointer offsets. Pointer fields may be locating using a bit mask having values which indicate whether a particular byte or group of bytes in memory associated with an object include a pointer field.

14 Claims, 6 Drawing Sheets

DEFRAGMENTATION OF STORED DATA WITHOUT POINTER INDIRECTION

FIELD OF THE INVENTION

The present invention pertains to the field of computer systems. More particularly, the present invention relates to techniques for defragmenting stored data in computer systems.

BACKGROUND OF THE INVENTION

Two mechanisms which have been widely used to implement memory allocation functions in computer systems are pointers and handles. A pointer is a variable which has a value representing an address of data rather than the data itself. Pointers are useful in allowing memory to be dynamically allocated and deallocated. Programming languages, software development tools, library code, and documentation are frequently based upon the assumption that the system will make use of the pointer abstraction. One problem with the use of pointers, however, is that it can result in fragmentation of stored data as memory locations are allocated and deallocated. Fragmentation results in the inefficient use of memory space. Note that fragmentation can occur in a system regardless of whether the system has a memory management unit.

Handles represent one solution to the problem of fragmentation. A handle is essentially a pointer to a pointer. Thus, the use of handles adds a level of indirection to the referencing of stored data as compared to the use of pointers. The handles technique eliminates the fragmentation problem, because the system can change the pointers without effecting the handles. The handles approach therefore allows memory to be allocated dynamically.

Although handles eliminate memory fragmentation, they also tend to require more computer program code than pointers. In addition, such code also tends to be less efficient and less robust than that associated with pointers. Also, because memory is required not only for the pointer itself but also for its handle, the handles approach tends to require more memory space than is desirable.

Hence, what is needed is a technique which will allow memory allocation with the ability to reduce fragmentation, which is well-suited to implementation in robust and efficient computer program code. In particular, it is desirable to have a solution which has the robustness and efficiency associated with pointers combined with the fragmentation management delivered via handles.

SUMMARY OF THE INVENTION

The present invention includes a method of reducing fragmentation of data stored in a memory in a computer system maintaining a number of pointers. The method includes the steps of waiting for the computer system to become idle, and then compacting data to reduce fragmentation by adjusting the values of the pointers only while the computer system is idle.

Another aspect of the present invention is a method of rearranging data referenced by a number of pointers. Information specifying the locations of the pointers is stored in a memory. After waiting for the computer system to become idle, the data is rearranged while the computer system remains idle. The information specifying the locations of the pointers is then used to locate the pointers, and the pointers are then updated according to the rearrangement of the data. However, the locations of the pointers are not changed in response to the rearrangement of the data.

Yet another aspect of the present invention is a method of rearranging stored data in which, after rearranging the data while the computer system is idle, a pointer update routine is executed based on the rearrangement of the data. The pointer update routine includes steps for changing the value of the pointer to an object for each object which has a pointer to data affected by the rearranging step.

In specific embodiments of the present invention, the pointer update routine may be a custom-designed routine for each particular class of objects or a generic routine usable for two or more classes. Also, in specific embodiments, a generic pointer update routine may be used in conjunction with a set of offsets of the pointers associated with a particular class of objects.

Still another aspect of the present invention is a method of locating pointers to data through the use of a bit mask. The values in the bit mask indicate whether a given segment of memory allocated for an object contains a pointer.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for defragmenting stored data without requiring pointer indirection is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes a technique for defragmenting data stored in memory in a computer system without requiring the indirection of pointers. As will be described below, this goal is accomplished by first creating a table which includes the locations of all pointers. The pointers themselves are stored in a separate block of memory from that of the table. In response to the defragmentation of data, the values of the pointers are updated as necessary without changing the actual locations of the pointers. Memory locations associated with variables are accessed at run time using the pointers themselves, in contrast with the handles approach. This technique therefore eliminates the additional level of indirection in the programming model that is associated with handles and thereby provides for greater efficiency in the code in which the memory allocation functions are implemented.

To implement the aforementioned technique, data defragmentation is performed only at idle time, i.e., when the computer system is not receiving input, since no entity requires a reference to a variable during such times. Thus, the technique of the present invention maintains the simplicity of the pointer approach while allowing fragmentation of data to be reduced or eliminated.

Figure 1:
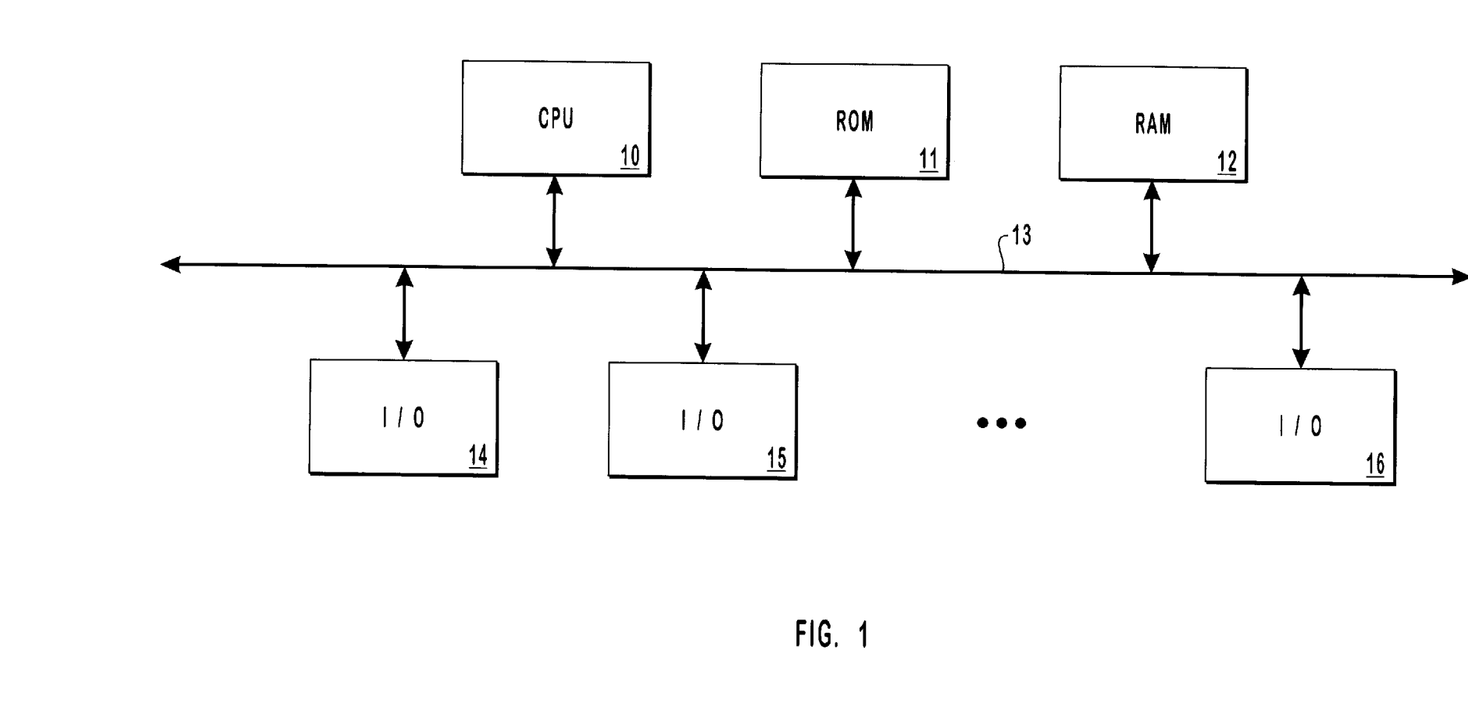
FIG. 1 illustrates a computer system in which the present invention is implemented.

FIG. 1 illustrates a computer system in which the present invention is implemented, according to one embodiment. The computer system 1 is a conventional computer system, which includes a central processing unit (CPU) 10, a read-only memory (ROM) 11, and a random access memory (RAM) 12, each coupled to a bus 13. Also coupled to the bus 13 are a number of input/output (I/O) devices 14–16. I/O devices 14–16 may include any of a number of commonly-used computer peripheral devices, such as a monitor, a keyboard, a pointing device, a mass storage device, or a communication device (e.,., modem, Ethernet adapter, ISDN adapter, etc.) Bus 13 in FIG. 1 may actually represent multiple physical buses, which may be interconnected by various bridges and/or adapters.

The computer system 1 is controlled by the CPU 10 executing sequences of instructions and operating upon data, either of which may be stored in RAM 12, ROM 11, I/O devices 14–16, or a combination thereof. Hence, various embodiments of the present invention may be implemented as sequences of instructions executable by a processor, such as CPU 10, and stored in a memory, such as RAM 12 or ROM 11. Such instructions may be loaded into memory from a mass storage device or from another computer system via a network connection. Aspects of the present invention may also be implemented as hardwired circuitry, rather than software instructions, or as a combination of both hardware and software. Thus, the present invention is not limited to any particular combination of hardware and/or software.

Figure 2:
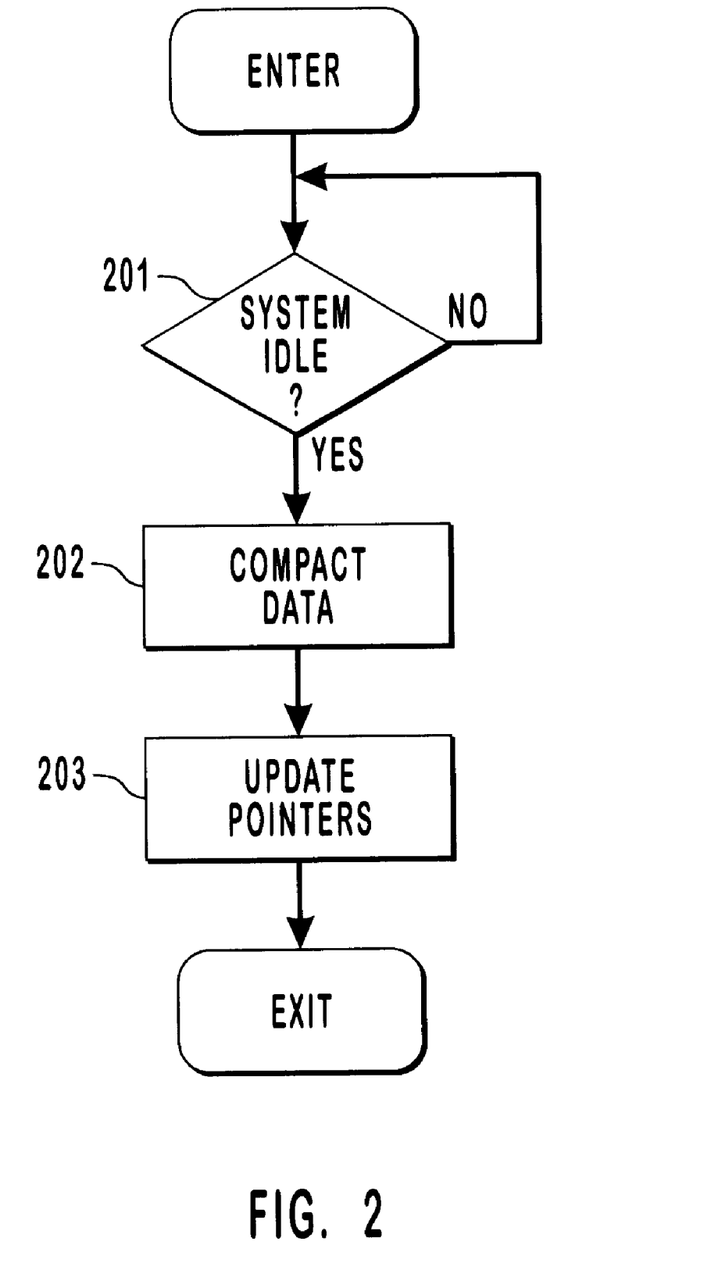
FIG. 2 is a flow diagram illustrating an overall routine for defragmenting data.

FIG. 2 illustrates an overall routine for defragmenting data stored in memory (i.e., RAM 12) of the computer system 1, according to one embodiment of the present invention. In step 201, it is determined whether the computer system 1 is idle (i.e., receiving no input). If so, then in step 202 the stored data is defragmented (i.e., compacted), and in step 203, all pointers affected by the defragmentation are updated appropriately to reflect the new locations of the data. If, in step 201, the system is not idle, then the system 1 waits until the system becomes idle before defragmenting the data.

Figure 3A:
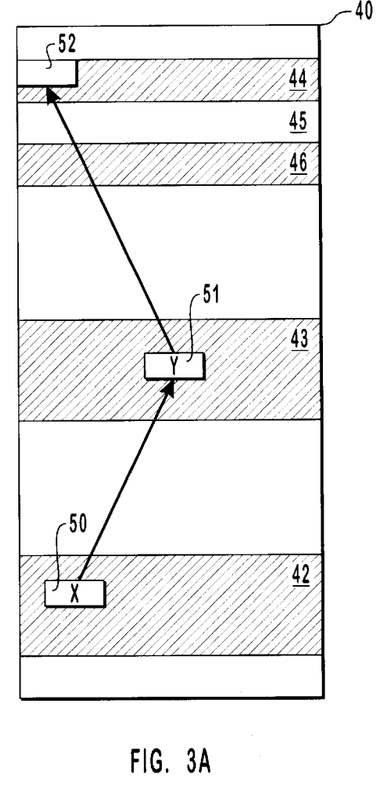
FIG. 3A illustrates a portion of memory in which data, pointers to the data, and a table of locations of the pointers are stored.
Figure 3B:
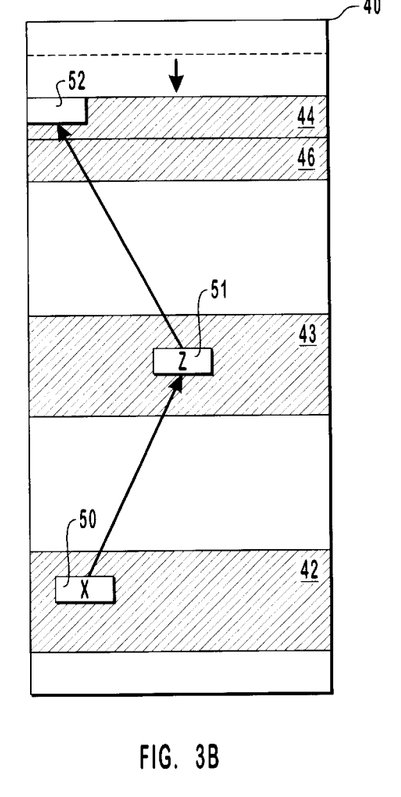
FIG. 3B illustrates the portion of memory of FIG. 3A after data defragmentation and updating of pointers.

FIGS. 3A and 3B illustrate the technique of the present invention with respect to use of memory space in RAM 12. FIGS. 3A and 3B illustrate the memory space 40 of RAM 12 at different points in time. Referring now to FIG. 3A, memory space 40 includes a number of blocks of data, two of which are shown as blocks 44 and 46. The data in block 44, for example, includes data 52. FIG. 3A further illustrates fragmentation of data in the form of unused memory space 45 between blocks 44 and 46. Memory block 43 is used to store the various pointers to data in blocks 44 and 46 in memory space 40.

The data stored in blocks 44 and 46 are represented by a number of variables used by a software application, the details of which are not needed for an understanding of the present invention. Each of the variables is accessed by a pointer stored in a separate block of memory 43 from the data. For example, pointer 51 in block 43 has a current value of Y, representing the location of data 52 in block 44.

In accordance with the present invention, another block of data 42 is provided which includes a table storing all of the locations of the pointers in block 43. For example, an entry 50 in the table has a current value X, representing the location of pointer 51 in block 43. In response to the defragmentation of data, only the value of the affected pointers in block 43 are changed. The entries in the table in block 42 representing the locations of the pointers are not changed. This technique is in contrast with the handles approach, in which the handle (i.e., the pointer to the pointer) must be changed in response to the referenced data being moved. Thus, in accordance with the present invention, software referencing data stored in blocks 44 or 46 (or any other block of memory) makes use of the actual pointers to reference variables and/or objects, rather than handles to the pointers. FIG. 3B illustrates the memory space 40 after defragmentation has been performed. After defragmentation, the unused memory space 45 has been removed, such that block 44 abuts block 46 (in terms of memory address). Because data 52 in block 44 now occupies a different location in memory space 40 compared to before defragmentation, the value of pointer 51 is changed to a new value Z. However, in accordance with the present invention, the location in memory space 40 of pointer 51 is not changed in response to defragmentation. Hence, the value X of table entry 50, indicating the location of pointer 51, has not changed as a result of the defragmentation.

Figure 4:
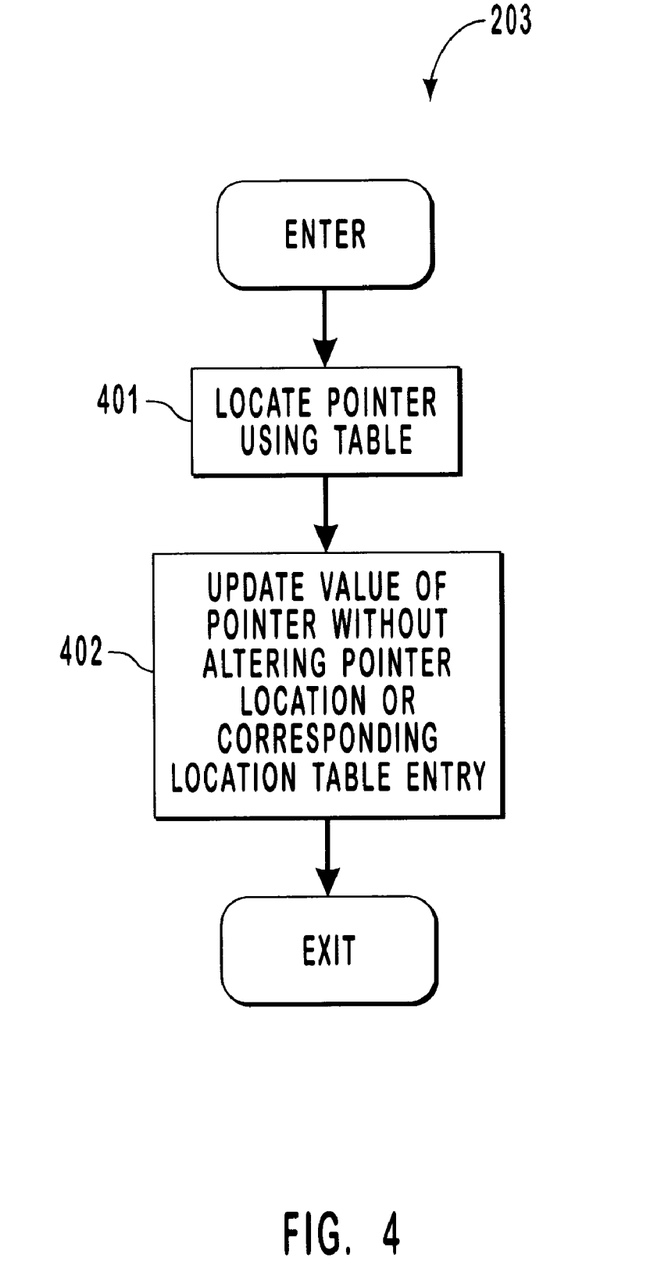
FIG. 4 is a flow diagram illustrating an overall routine for updating pointers in accordance with the present invention.

FIG. 4 illustrates in greater detail the step 203 of updating the pointers. In step 401, a pointer affected by the defragmentation process is located using the pointer location table stored in memory block 42. In step 402, the value of the pointer stored in block 43 is updated, whereas the location of the pointer and the pointer location table entry remains unchanged.

Various approaches may be used to updating the values of pointers. One approach according to the present invention, in an object-oriented environment, is to write a method (routine) for each particular class of objects that might be referenced at run time. Each such method would be custom-designed for each class based on the software designer's knowledge of the particular pointers associated with the class.

Assume, for example, that an object, Move_Object, is to be moved as a result of memory reallocation and that an object of a class, Sample_Class, requires knowledge of the location in memory of the object Move_Object. Assume further that an object of class Sample_Class has a number of fields associated with it, at least one of which is a pointer, Pointer, to the object Move_Object. Hence, a pointer update method Adjust_Pointers can be written for Sample_Class, as will now be described.

In one embodiment, the method Adjust_Pointers receives as parameters the old (pre-defragmentation) starting address, Old, of the object to be moved, the new (post-defragmentation) starting address, New, of the object to be moved, and the number of bytes in the memory space, Size, of the object Move_Object. Hence, an embodiment of the Adjust_Pointers method is illustrated by the routine shown in FIG. 5. In steps 501 and 502, it is determined whether the value of Pointer falls within the memory space allocated to the object Move_Object. If either of the conditions in steps 501 and 501 is false, then the value of Pointer falls outside the space allocated to Move_Object, and the routine exits. If both conditions are met, then the value of Pointer falls within the space allocated to Move_Object, and the value of Pointer is updated in step 503 as Pointer=New+(Pointer−Old).

Figure 5:
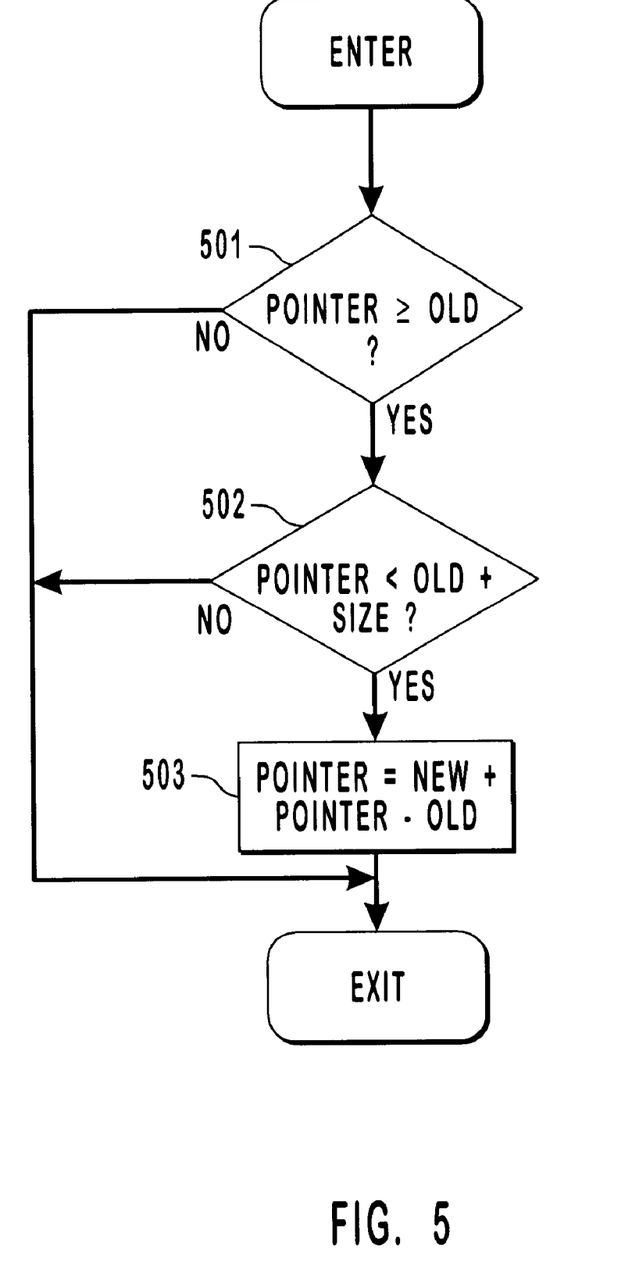
FIG. 5 is a flow diagram illustrating a routine for updating pointers in an object-oriented environment in accordance with the present invention.

Thus, the Adjust_Pointers method can be written according to the following pseudocode:

Sample_Class: Adjust_Pointers (Old, New, Size)
  Begin
    If ((Pointer≧Old) and (Pointer<(Old+Size)) then
      Pointer=New+(Pointer−Old)
  End In accordance with the present invention, a method such as Adjust_Pointers is applied to each class (e.g., Sample_Class) which requires knowledge of the location of an object to be moved (e.g., Moved_Object). Further, the method should also be called for any class from which such class inherits (e.g., for any class from which Sample_class inherits). Note that the above method can also be easily modified to accommodate objects (to be moved) which have multiple pointer fields.

Another approach to updating pointers is to write a more generic pointer update method, rather than a custom designed method for each class, and to provide a list of pointer offsets for use by the method. The list of offsets would include the relative memory offset within each object of the pointer fields of that object. Hence, in response to defragmentation of data, the generic routine can be executed using the list of offsets as input, to update the values of all pointers affected by the defragmentation. Note that this approach may require access to information that is private in some systems.

Figure 6A:
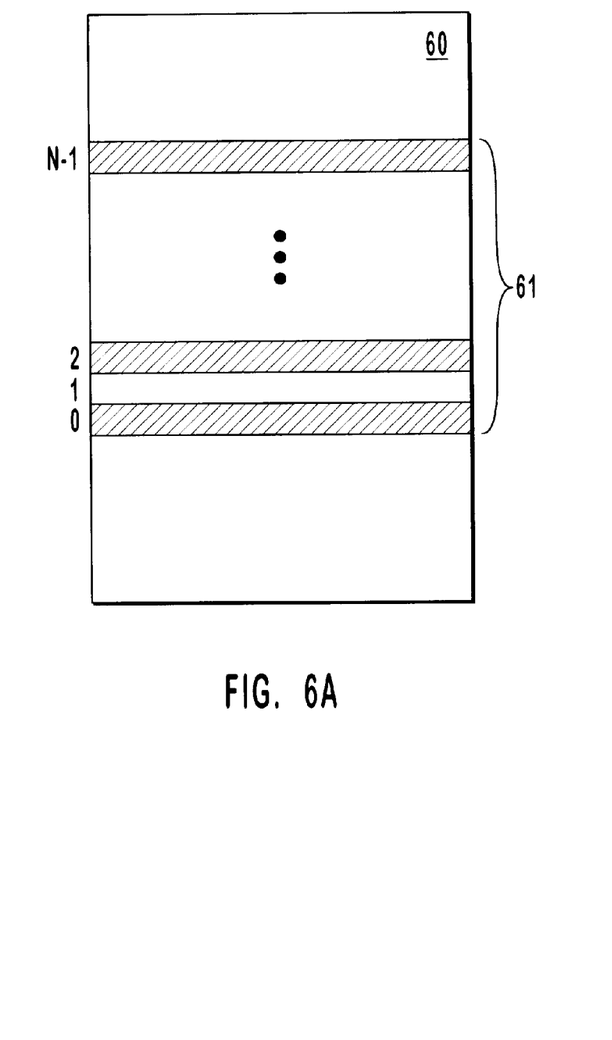
FIG. 6A illustrates a portion of memory in which a block allocated to an object is stored.
Figure 6B:
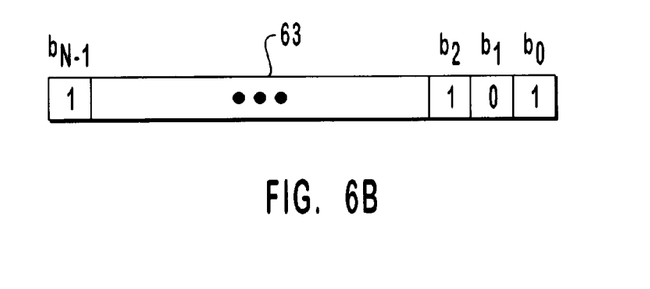
FIG. 6B illustrates a bit mask for locating pointer fields associated with the object of FIG. 6A.

One approach to locating pointers (e.g., for the purpose of updating the pointers) is, in accordance with the present invention, to provide a bit mask for each class of objects, wherein the value of each bit in the bit mask indicates whether or not a given subset of the memory space associated with the class contains a pointer field. This approach is illustrated in FIGS. 6A and 6B. FIG. 6A illustrates a memory space 60 in which a block of memory 61 is allocated for a sample object. The block 61 consists of N words (0, 1, 2, . . . , N−1), which include a number of pointer fields. In this example, each field is assumed to occupy one word of memory space. The words which contain pointer fields are indicated in FIG. 6A as shaded rectangles. Thus, it can be seen that words 1, 2, and N−1 include pointer fields, while word 0 does not.

FIG. 6B illustrates a bit mask 63 associated with block 61 of the sample object. Bit mask 63 includes N bits ($b_0$, $b_1$, $b_2$, . . . , $b_{N-1}$). In this example, bits $b_0$, $b_2$, and $b_{N-1}$ are set to a value of one (1) to indicate that the corresponding words (words 0, 2, and N−1) contain pointer fields. Bit $b_1$ has a value of zero (0), because the corresponding word (word 1) in FIG. 6A contains no pointer field. In one embodiment, each bit mask is a 32-bit value, each bit of which corresponds to one word of memory space.

In another embodiment of the present invention, an approach to locating and updating pointers combines the use of a bit map to locate pointer fields with the use of a list of offsets, such as that described above. For example, a predetermined bit pattern appearing in a bit mask (e.g., all ones) may function as a signal to the software to refer to a list of pointer offsets to locate the pointers corresponding to that class. An advantage of this approach is that it supports exceptionally large objects.

Thus, a technique for defragmenting stored data without pointer indirection has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a computer system including a processor and a memory coupled to the processor, and one or more I/O devices connected to the processor, and wherein the memory is organized to include a plurality of data blocks, some of which are stored with data and some of which are empty, at least some of the data blocks containing data having one or more empty data blocks interspersed therebetween so that the stored data is fragmented, a method of reducing fragmentation of the stored data in the memory, the method comprising the steps of:

storing in the memory a plurality of pointers each of which includes a value that identifies an address of a data block in which data is stored;

storing in the memory a table which includes the locations of all pointers;

while the processor is not receiving input from any I/O device, defragmenting the stored data by performing the steps of:

compacting the stored data by rearranging at least some of the data blocks so that the stored data is contained in data blocks that arc more closely adjacent to one another; and updating the value of each pointer that identifies a data block that has been moved without changing the location of any such pointer in said stored table.

2. A method as defined in claim 1 wherein said step of updating the value of each pointer is comprised of the steps of:

using said table which includes the locations of all pointers to locate said pointers after said compacting step has been performed; and updating the values of the pointers based on said step of compacting the stored data.

3. A method as defined in claims 1 or 2 wherein said stored data is comprised of data objects and wherein a first object is referenced by a plurality of other objects, each of the other objects having a pointer to the first object, and wherein said step of compacting comprises the step of relocating the first object within the memory, and wherein said step of the updating the value of each pointer comprises the step of executing a pointer update routine for each object which references the first object based on the relocating step, the pointer update method for updating the value of a pointer to the first object from a first value to a second value based on the relocating step for each object which references the first object.

4. A method as defined in claim 3 wherein said step of executing said pointer update routine comprises the steps or identifying a particular class of objects and updating the particulars pointers for that class of objects.

5. A method according to claim 1, wherein the step of updating the values of the pointers is performed by executing a pointer update routine based on the compacting step, the pointer update routine including steps for changing the value of a pointer of an object from a first value to a second value for each pointer field of cach object affected by the compacting step.

6. A method according to claim 1, wherein the data corresponds to a plurality of object classes, the method further comprising the step of, for each object class, allocating a bit mask having a plurality of bits, each bit corresponding to a segment of memory allocated to the object class, the value of each bit indicating whether the corresponding segment of memory includes a pointer field.

7. A method according to claim 1, further comprising the step of reading the values of the bits in the bit mask to determine the locations of the pointers of an object.

8. A computer program product for use in a computer system including a processor and a memory coupled to the processor, and one or more I/O devices connected to the processor, and wherein the memory is organized to include a plurality of data blocks, some of which are stored with data and some of which are empty, at least some of the data blocks containing data having one or more empty data blocks interspersed therebetween so that the stored data is fragmented, the computer program product comprising a computer readable medium for storing executable instructions by which the computer system will implement a method of reducing fragmentation of the stored data in the memory, the method comprising the steps of:

storing in the memory a plurality of pointers each of which includes a value that identifies an address of a data block in which data is stored;

storing in the memory a table which includes the locations of all pointers;

while the processor is not receiving input from any I/O device, defragmenting the stored data by performing the steps of:

compacting the stored data by rearranging at least some of the data blocks so that the stored data is contained in data blocks that are more closely adjacent to one another; and updating the value of each pointer that identifies a data block that has been moved, without changing the location of any such pointer in said stored table.

9. A computer program product as defined in claim 8, wherein the step of updating the values of the pointers is performed by executing a pointer update routine based on the compacting step, the pointer update routine including steps for changing the value of a pointer of an object from a first value to a second value for each pointer field of each object affected by the compacting step.

10. A computer program product as defined in claim 8, wherein the data corresponds to a plurality of object classes, the method further comprising the step of, for each object class, allocating a bit mask having a plurality of bits, each bit corresponding to a segment of memory allocated to the object class, the value of each bit indicating whether the corresponding segment of memory includes a pointer field.

11. A computer program product as defined in claim 8, wherein the implemented method further comprises the step of reading the values of the bits in the bit mask to determine the locations of the pointers of an object.

12. A computer program product as defined in claim 8 wherein said step of updating the value of each pointer is comprised of the steps of:

using said table which includes the locations of all pointers to locate said pointers after said compacting step has been performed; and updating the values of the pointers based on said step of compacting the stored data.

13. A computer program product as defined in claim 8 wherein the said stored data is comprised of data objects and wherein a first object is referenced by a plurality of other objects, each of the other objects having a pointer to the first object, and wherein said step of compacting comprises the step of relocating the first object within the memory, and wherein said step of the updating the value of each pointer comprises the step of executing a pointer update routine for each object which references the first object based on the relocating step, the pointer update method for updating the value of a pointer to the first object from a first value to a second value based on the relocating step for each object which references the first object.

14. A computer program product as defined in claim 8 wherein said stop of executing said pointer update routine comprises the steps of identifying a particular class of objects and updating the particulars pointers for that class of objects.

* * * * *

UNITED STATES PATENT AND TRADEMARK OFFICE
CERTIFICATE OF CORRECTION

PATENT NO. : 5,963,982
DATED : October 5, 1999
INVENTOR(S) : Phillip Y. Goldman

It is certified that error appears in the above-indentified patent and that said Letters Patent is hereby corrected as shown below:

Cover Page, col. ln: 25: after "may be" change "locating" to --located--

Col. 3, ln. 27: after "device" change "(e...." to --(e.g.,--

Col. 4, ln. 23: after "pointers." insert --PARAGRAPH BREAK--

Col 4, ln. 58: after "method" change "Adjust Pointers" to --Adjust_Pointers--

Col. 5, ln. 3: after "501 and" change "501" to --502--

Col. 5, ln. 48: after "words" change "1" to --0--

Col. 5, ln. 49: after "word" change "0" to --1--

Col. 6, ln. 31: after "blocks that" change "arc" to --are--

Col. 6, ln. 58: after "steps" change "or" to --of--

Col. 6, ln. 60: before "pointers" change "particulars" to --particular--

Col. 6, ln. 66: after "field of" change "cach" to --each--

Col. 8, ln. 37: after "wherein said" change "stop" to --step--

Col. 8, ln. 39: after "updating the" change "particulars" to --particular--

Signed and Sealed this

First Day of May, 2001

Attest:

NICHOLAS P. GODICI

Attesting Officer     Acting Director of the United States Patent and Trademark Office